N. TESLA.
SPEED INDICATOR.
APPLICATION FILED MAY 29, 1914.
1,209,359.
Patented Dec. 19, 1916.
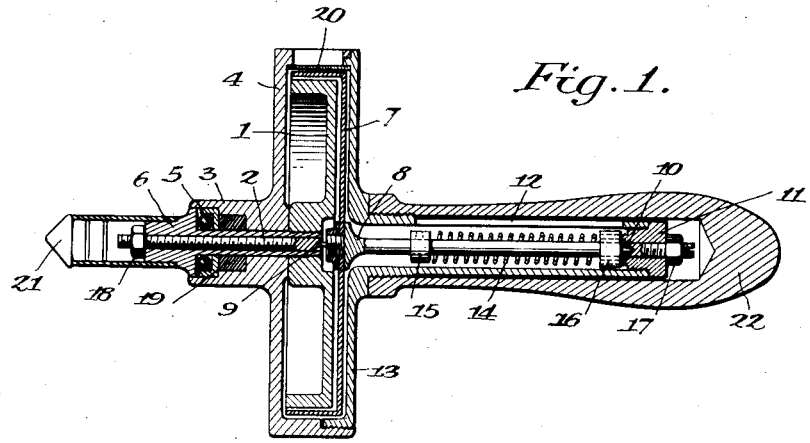
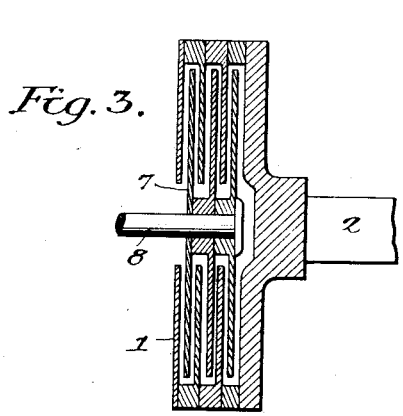
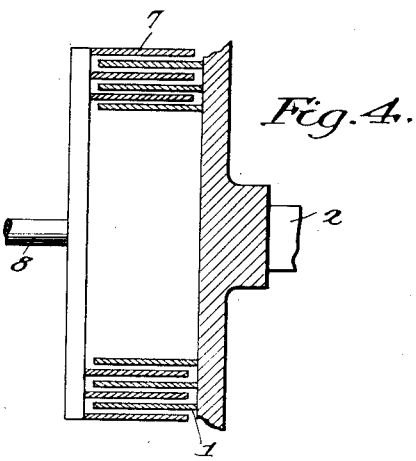
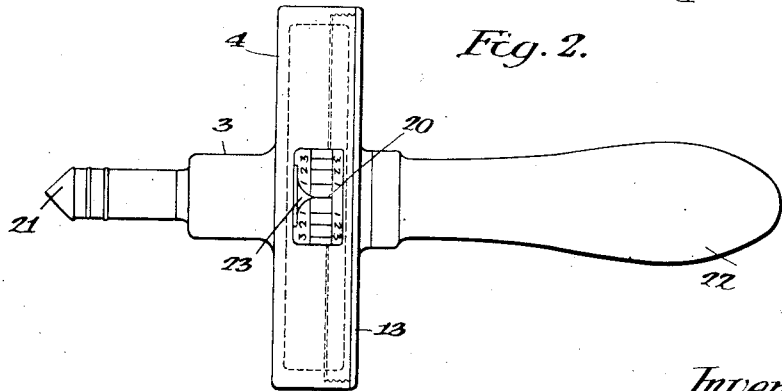
Inventor:
Nikola Tesla

UNITED STATES PATENT OFFICE.

NIKOLA TESLA, OF NEW YORK, N. Y., ASSIGNOR TO WALTHAM WATCH COMPANY, OF WALTHAM, MASSACHUSETTS, A CORPORATION OF MASSACHUSETTS.

SPEED-INDICATOR.

1,209,359.      Specification of Letters Patent.      Patented Dec. 19, 1916.

Application filed May 29, 1914. Serial No. 841,726.

*To all whom it may concern:*

Be it known that I, NIKOLA TESLA, a citizen of the United States, residing at New York, in the county and State of New York, have invented certain new and useful Improvements in Speed-Indicators, of which the following is a full, clear, and exact description.

In the provision of speed indicators, that give direct readings of rate of motion,—for example shaft speeds in terms of revolutions per minute or vehicle speeds in miles per hour—it is obviously important that the instrument be simple, inexpensive and durable, and that its indications be correct throughout a wide range of speed. Likewise it is very desirable that its operation shall be subject to little or no appreciable deviation from accuracy under normal or expected extraneous changes, such as those of atmospheric density, temperature, or magnetic influence, in order that the structure may be free from any complications incident to the employment of specific means compensating for such varying conditions.

My present invention supplies a speed measuring appliance amply satisfying commercial demands as above stated, in a structure wherein the adhesion and viscosity of a gaseous medium, preferably air, is utilized for torque-transmission between the driving and driven members.

More particularly, my invention provides a rotatable primary and a mechanically resistant or biased pivoted secondary element, coöperating through an intervening fluid medium to produce, inherently, without the use of compensating instrumentalities, angular displacements of the secondary element in linear proportion to the rate of rotation of the primary, so that the reading scale may be uniformly graduated. This latter advantage is secured through the application of novel principles, discovered by me, which will be presently elucidated.

In investigating the effects of fluids in motion upon rotative systems I have observed that under certain conditions to be hereafter defined, the drag or turning effort exerted by the fluid is exactly proportionate to its velocity relative to the system. This I have found to be true of gaseous and liquid media, with the distinction however, that the limits within which the law holds good are narrower for the latter, especially so when the specific gravity or the viscosity of the liquid is great.

Having determined the conditions under which the law of proportionality of torque to speed (rather than to the square of the speed or to some higher exponential function of the same) holds good, I have applied my discoveries in the production of new devices—essentially indicators of speed but having wider fields of use—which are, in many aspects, superior to other forms of speedometers.

Specifically I have devised rate-of-motion indicators which comprise driving and driven members with confronting, closely-adjacent, noncontacting, smooth, annular surfaces of large area, coacting in the transmission of torque through the viscosity and adhesion of interposed thin films of air,—mechanical structures offering numerous constructive and operative advantages. Furthermore, by properly designing and coordinating the essential elements of such instruments I have secured substantial linear proportionality between the deflections of the indicating or secondary element and the rate of rotation of the driving or primary member.

The conditions more or less indispensable for this most perfect embodiment of my invention—that is to say, embodiment in a speed indicator approximating rigorous linear proportionality of deflection to speed—are:

1. The arrangement should be such that the exchange of fluid acting on the system is effectively prevented or minimized. If new fluid were permitted to pass freely between the elements there would be, as in a pump, with the rise and fall of velocity, corresponding changes of quantity and the torque would not vary directly as the speed, but as an exponential function of the same. Broadly speaking, such provision as is commonly made in hydraulic brakes for free circulation of fluid with respect to the rotative system, with the attendant acceleration and retardation of the flow, will generally produce a torque varying as the square of the speed, subject however, in practice, to influences which may cause it to change according to still higher powers. For this reason confinement of the fluid intervening between the primary and secondary elements of the system so that such active, torque-transmitting medium may remain resident, and not be constantly renewed, is vital to complete attainment of the desired linear proportionality.

2. The spaces or channels inclosing the active medium should be as narrow as practicable, although within limits this is relative, the range of effective separation increasing with the diameter of the juxtaposed rotative surfaces. My observations have established that when the spacing is so wide as to accommodate local spiral circulation in the resident fluid between the confronting areas, marked departures from rigorous proportionality of torque to speed occur. Therefore in small instruments with primary members of but few inches diameter, it is desirable that the channels should be as narrow as is mechanically feasible with due regard to the importance of maintaining the noncontacting relation of the rotative parts.

3. The velocity of the fluid relative to the system should be as small as the circumstances of the case will permit. When a gas such as air is the active medium, it may be 100 feet per second or even more, but with liquids speeds of that order cannot be used without detriment.

4. The bodies exposed to the action of the fluid should be symmetrically shaped and with smooth surfaces, devoid of corners or projections which give rise to destructive eddies that are particularly hurtful.

5. The system should be so shaped and disposed that no part of the moving fluid except that contained in the spaces or channels can effect materially the torque. If this rule is not observed the accuracy of the instrument may be impaired to an appreciable degree, for even though torque transmission between the confronting surfaces is proportional, there may yet be a component of the rotary effort (through the fluid coacting with the external surfaces) proportional to an exponential function of the speed. Hence it is desirable that by a closely investing casing, or other means, the torque-transmitting effect of fluid outside of the channels between the rotative parts be minimized.

6. In general the flow of the medium should be calm and entirely free from all turbulent action. As soon as there is a break of continuity the law above stated is violated and the indications of the device cease to be rigorously precise.

These requirements can be readily fulfilled and the above discoveries applied to a great many valuable uses, as for indicating the speed of rotation or translation, respectively, of a shaft, or a vehicle, such as an automobile, locomotive, boat or aerial vessel; for determining the velocity of a fluid in motion; for measuring the quantity of flow in steam, air, gas, water or oil supply; for ascertaining the frequency of mechanical and electrical impulses or oscillations; for determining physical constants; and for numerous other purposes of scientific and practical importance.

The nature and object of the invention will be clearly understood from the succeeding description with reference to the accompanying drawings in which:

Figure 1 represents a vertical cross section of a speed indicator or hand tachometer embodying the above principles; Fig. 2 is a horizontal view of the instrument disclosing part of the scale, and Figs. 3 and 4 are diagrammatic illustrations showing modified constructions of the main parts in a similar device.

Referring to Fig. 1, 1 is a pulley-shaped metal disk from three to four inches in diameter constituting the freely-rotatable primary element. It is fastened to a driveshaft 2 which is turned to fit a hole in the central hub 3 of the casting 4. A ball bearing 5 set in a recess of the former, serves to take up the thrust against the shoulder 6 of the shaft and insures free running of the same. In close proximity to the disk 1 is the thin shell 7 in the form of a cup, this being the secondary element of the system. It is made of stiff and light material, as hard aluminum, and is fixed to a spindle 8, supported in nearly frictionless bearings or pivots 9 and 10. As before remarked the spacing between the two elements, (1 and 7), should best be as small as manufacturing conditions may make feasible. By way of example, a separation,—in an instrument of the diameter suggested,—of say .015″ to .025″ will be found effective for working purposes and also within a reasonable range of inexpensive mechanical attainment. Still smaller spacing is, however, theoretically desirable. One of the bearings aforesaid is screwed into the end of the shaft 2 and the other into a plug 11 in a slotted tubular extension 12 of a casting 13. The running bearing in the shaft, though not of perceptible influence on the indications, may be replaced by a stationary support behind and close to shell 7, as at 8. A torsional spring 14 is provided, for biasing the pivoted element 7, having its ends held in collars 15 and 16, which can be clamped, as by the set screws shown, the one to the spindle 8 and the other to the plug 11. The bearings 9 and 10 are capable of longitudinal adjustment and can be locked in any position by check nuts 17, and 18, but this refinement is generally unnecessary. The castings 4 and 13, in the construction specifically shown, when screwed together form a casing that closely invests the rotative system. This casing forms one available means for preventing communication of torque from the primary element 1 to the secondary member 7 through the medium contacting with the external surfaces of both, to any extent sufficient for materially modifying the torque due to the films between the elements, but other means to this end may be substituted. The chamber inclosed within the casting should be airtight for highest accuracy in order that the density of the contained medium may remain constant, although in the vast majority of cases where air is used as the active agent, the slight effects of ordinary changes of temperature and density of the external atmosphere can be ignored, as they are in a measure neutralized by the concomitant variations in the resilience of the torsional spring and as they do not seriously affect the proportionality of deflections observed. However, when great precision is essential, a seal 19 of suitable packing, paste or amalgam may be employed. Obviously the working parts may be contained in a separate, perfectly tight reservoir filled with fluid of any desired character, the rotating member or disk 1 being driven by a magnet outside. This expedient has been adopted in numerous instances and is quite familiar. The casting 4 has a window or opening 20, closed by a piece of transparent substance, such as celluloid, for enabling the readings to be made on the scale which is engraved upon or glued to the rim of the indication-controlling element or shell 7. The shaft 2 is armed with a steel or rubber tip 21, and a handle 22 of fiber or other material is fastened to the central hub of casting 13, completing the hand tachometer.

Fig. 2 in which like numbers designate corresponding parts is self-explanatory.

Attention may be called to the pointed index 23 placed in the opening 20 and marking, when the instrument is not in use, zero on the scale. The latter can be readily put in proper position by turning the collar 16 to the desired angle.

As described the device is adapted for use in the manner of an ordinary hand tachometer. In taking the revolutions of a shaft, the tip 21 is placed firmly into the central cavity of the former, as usual, with the result of entraining the disk 1 and bringing it to full speed by friction. The active medium, preferably air, in the narrow channels between the rotating and pivoted members, by virtue of its adhesion and viscosity, is set in circular motion by the primary element, and, giving up the momentum imparted to it on the light secondary shell 7, causes the latter to turn until the torque exerted is balanced by the retractile force of spring 14. Care should be taken to employ a spring the resistance of which increases linearly with displacement, so that the deflections are exactly proportionate to the torsional effect, as otherwise the indications will not be true to scale, even though the instrument be prefect in other respects. In order that the torque should vary rigorously as the speed, the fluid particles in the minute channels between the rotating and pivoted members should move in circles and not in spirals, as necessarily would be the case in a device in which pumping action could take place, and either by making both the primary and secondary elements effectively-imperforate to prevent central admission of air, or otherwise so constructed and conditioned that air may not freely pass from center to periphery between the elements of the moving system unchanging residence of a definite body of the active medium within the system is insured. Where pumping action,—that is to say, acceleration or retardation of fluid movement other than circularly with the primary element,—takes place the deflections increase more rapidly than the speed. It follows that centrifugal force, which is the essential active principle in pumping, must be negligible to avoid compression of the air at the periphery which might result in a sensibly increased torque. To appreciate this, it should be borne in mind that the resistance of a circular strip of the active area would, under such conditions, be proportionate to the fourth power of the diameter so that a slight compression and attendant increase of density of the medium in the peripheral portion would cause a noticeable departure from rigorous proportionality. Experience has demonstrated that when the space is very narrow, as is indispensable for the fullest attainment of the desired proportionality, the centrifugal effect of the active fluid, be it gaseous or liquid, is so small as to be unobservable. The inference is that the actions in the narrow space between the rotative members are capillary or molecular and wholly different in principle from those taking place in a pumping device in which the fluid masses are alternately retarded and accelerated. The scale, which, as will be apparent from the preceding, is uniform in an instrument best embodying my invention, may be so graduated that each degree corresponds to a certain number of revolutions per unit of time, and for convenience, (in shaft-speed indicators as herein shown), the constant is made a round number, as 100. The establishment of this relation through the adjustment of the torsional spring is facilitated by varying the distance between the parts 1 and 7, thus modifying the torque and consequently the deflection, (the torque varying inversely as the distance) while always keeping within the range throughout which linear proportionality is attainable. In calibrating it is necessary to make but one observation comparative with some positive standard and to plot the balance of the scale accordingly. The conditions above set forth being realized, the reading will be accurately proportionate to the speed and the constant will be correct through the whole range contemplated in the design. Therein lies a very important advantage bearing on manufacture and introduction of devices of this character over those now in use which are based on an empirical scale, tedious to prepare, and unreliable. When desired, the instrument may be rendered dead beat through magnetic or mechanical damping, but by making the torque very great, and the inertia of the secondary element very small, such objectionable complication may be avoided. With a given separation the turning effort is proportionate to the product of the velocity of rotation, the density of the fluid and the aggregate area of the active surfaces, hence by increasing either of these factors the torsion can be augmented at will. It obviously follows that the pull exerted on a circular disk will be as the third power of the diameter and one way of attaining the object is to use a large plate. Other and better ways are illustrated in Figs. 3 and 4 in which the rotating and pivoted elements are composed of interleaved disks or cylinders. The first arrangement permits an indefinite increase of the torque, the second commends itself through the facility of adjustment of the force by varying the active area.

For many reasons it is decidedly advantageous to employ air as the agent in an instrument intended for popular purposes, especially those involving rough use and inexpert handling, since thereby the cost of manufacture may be kept low, the need for ensealing minimized and susceptibility of the parts to easy disassembling and replacement attained. It is, therefore, desirable that the annular confronting surface of the elements,—whether of disk or cylindrical form,—be sufficiently extensive for securing ample torque to make the instrument approximately dead beat and to minimize the percentage of error due to mechanical imperfections.

The foregoing description contains, I believe, all the information necessary for enabling an expert to carry my invention into successful practice. When using the indicator in the manner of an ordinary vehicle speedometer, as in an automobile, the shaft 2 is rigidly or flexibly geared to the driving axle or other suitable part and readings are made in miles per hour, as is customary. As will be apparent many other valuable uses may be served, since the primary element may be connected in suitable electrical or mechanical manner with any rotating part, the speed of which may be translated through a linearly proportionate constant into the desired terms of time and quantity, and the reading scale may be calibrated in such terms. It will also be evident that by accurate workmanship, following the teachings of my invention, instruments at once simple, rugged, and scientifically accurate may be constructed for a very wide range of uses in either huge or tiny sizes; and, since the commercial requirements of accuracy in many fields gives a reasonable range of permissive error, manufacturing considerations may lead to deviations from strict observance of some of the conditions that I have indicated as best attaining a rigorous proportionality of reading. The provision of simple mechanical elements, coöperating primarily only through the viscosity and adhesiveness of the air films intervening therebetween and substantially free from need for ensealing and from error caused by changes of extraneous conditions, especially temperature, affords striking commercial advantages unattainable in any form of speedometer of which I am aware. Therefore while I have described in detail for the purpose of full disclosure a specific and highly advantageous embodiment of my invention, it will be understood that wide variations in the mechanical development thereof may be made without departure from its spirit within the scope of the appended claims.

What I claim is:

1. In combination, fixed supporting means, disconnected alined driving and driven shafts rotatably mounted in said supporting means, relatively thin spaced rigid pieces of material rigidly connected to and arranged coaxially about said driven shaft with broad surfaces opposite each other, and other relatively thin spaced rigid pieces of material rigidly connected to and arranged coaxially with the driving shaft, and being alternated with the first-mentioned pieces between them and having their broad surfaces adjacent to and spaced from the broad surfaces of said other pieces, said pieces all arranged in air, through which torque is frictionally transmitted from the second-mentioned pieces to those first-mentioned.

2. In combination, in a speedometer, disconnected alined driving and driven shafts, a fixed support, said shafts being mounted in said support, a coiled spring having one end secured to said fixed support and the other end secured to said driven shaft, relatively thin spaced rigid pieces of material rigidly connected to and arranged coaxially about said driven shaft with their broad surfaces opposite each other, other relatively thin spaced rigid pieces of material rigidly connected to and arranged coaxially with the driving shaft, and being alternated between said first-mentioned pieces and spaced therefrom, and an air body filling the spaces between said pieces and constituting the torque-transmitting friction medium therebetween.

3. In combination, in a speedometer, disconnected alined driving and driven shafts, a frame having bearings for said shafts, a coiled spring whose inner end is secured to said driven shaft and having its outer end secured to said frame, spaced rigid pieces of material rigidly connected to and arranged about said driven shaft, and other spaced rigid pieces of material rigidly connected to and arranged about said driving shaft, the former pieces being alternated between the latter pieces in spaced relation with their broad surfaces in close juxtaposition, and with the interspaces between said spaced pieces forming a convoluted air-containing channel therebetween open to the surrounding air.

4. In combination, disconnected alined driving and driven shafts, a fixed support, bearings therefor in said support, a coiled spring having one end secured to the driven shaft and its other end secured to said fixed support, a cup-shaped body secured to one end of said driving shaft coaxially, spaced rigid relatively thin plates secured to said body in parallel relation to each other, another cup-shaped body secured coaxially to said driven shaft and inclosing said plates at their outer edges in spaced relation thereto, other spaced rigid relatively thin plates secured to the second-mentioned body and extending between the first-mentioned plates in spaced relation thereto, and an air body filling the spaces between said pieces frictionally to transmit torque from the driving structure to the driven structure.

5. The combination with means for support and driving and driven shafts rotatably supported thereby, of means to transmit torque from the driving shaft to the driven shaft comprising opposed material-pieces respectively connected with the driving shaft and the driven shaft and arranged to present toward each other relatively-extensive, non-contacting, closely-adjacent surfaces, and a gaseous medium in which said pieces work, said gaseous medium serving frictionally to connect the said opposed material-pieces for transmission of torque from the driving shaft to the driven shaft.

6. In combination, driving and driven elements suitably supported and having confronted annuli always presenting to each other relatively-extensive, non-contacting, closely-adjacent surfaces, said surfaces disposed in a gaseous friction medium, whereby the driving member, by its rotation, induces rotary motion of the driven member through the drag of the gaseous medium intervening between said annuli.

7. In combination, driving and driven elements having in opposed, closely adjacent, non-contacting relation, relatively extensive friction surfaces, and an interposed gaseous body, through which the driving member frictionally drags the driven element.

8. In a speedometer, the combination with supporting means, separately-rotatable driving and driven shafts mounted therein, biasing means for the driven shaft, and means to indicate rotary displacement of the biased shaft in terms of speed, of pieces rotatively carried by said respective shafts, having relatively-extensive, non-contacting, closely-adjacent surfaces arranged to confront each other, and a gaseous medium intervening between said confronting surfaces to coact therewith frictionally to transmit torque from the driving shaft to the biased driven shaft.

9. In a speedometer, the combination of a primary element rotatable at varying speeds, having a plurality of spaced annuli, a biased secondary element, arranged for separate rotary movement and adapted and arranged to indicate speed variations by the extent of its displacement, said secondary element having a plurality of spaced, thin, light annuli, the annuli of said two elements interleaved in non-contacting, closely-adjacent relation always to present toward each other extensive friction surfaces, and an air body, through the films of which, intervening between said annuli, rotation of the primary element may induce speed-indicating displacement of the secondary element.

10. A speedometer wherein a primary, variable-speed element, and a biased, speed-indication-controlling secondary element, that are suitably supported for separate movement, have opposed extensive friction surfaces in non-contacting juxtaposition for frictional communication of power from the primary element to the secondary element through a gaseous medium that intervenes between said friction surfaces.

11. An air drag speedometer, wherein a primary, variable-speed element and a biased speed-indication-controlling secondary element, that are suitably mounted for separate rotary movement in an air-containing casing, have opposed, extensive friction-surfaces in non-contacting juxtaposition, for frictional communication of torque from the primary element to the secondary element through the medium of the casing-contained air.

12. In a speedometer, the combination of an air containing casing, a primary element and a secondary element mounted in said casing for separate movement, said elements having extensive surfaces exposed toward each other in closely contiguous but non-contacting relation for frictional communication of power to one from the other through the intervening air, means resiliently to resist displacement of the secondary element, and means to indicate displacement of the secondary element in terms of speed.

13. In combination, in a speedometer, disconnected shafts respectively carrying driving and driven elements that have annuli affording continuous extensive friction surfaces in always confronting non-contacting closely-spaced relation, the driven element being light and biased by a light spring, for ready response to torque transmitted frictionally by air, and the air film-spaces between the elements constituting an open tortuous channel; and an air containing casing inclosing the driving and driven elements, its contained air body forming the sole effective means of torque transmission between the elements.

14. In a speedometer, the combination of rotatable driving and driven elements having in opposed, closely-adjacent non-contacting relation, relatively extensive friction surfaces, means to bias the driven element, means to indicate rotary displacement of said driven element in terms of speed, a casing inclosing said elements and containing air, said contained air body extending in films between the friction surfaces, and forming the sole effective means of torque transmission between the driving and driven elements.

15. In combination, driving and driven elements having in opposed non-contacting relation relatively extensive friction surfaces so closely adjacent that through an interposed gaseous body the driving member frictionally drags the driven member with a torque linearly proportionate to the speed of the former.

16. A rate indicator wherein a freely-rotatable primary and a biased, indication-controlling secondary member, suitably supported for separate movement, have opposed, non-contacting surfaces in such close proximity that through an intervening viscous fluid medium torque is transmitted to the secondary member in linear proportion to the speed of the primary.

17. A rate indicator wherein a freely rotatable primary and a biased, indication-controlling secondary element, suitably supported for separate movement are operatively linked through an intervening viscous and adhesive air body, said elements having opposed, extensive non-contacting surfaces so closely adjacent that the torque transmitted to the secondary element through said air body is substantially in linear proportion to the speed of the primary element.

18. In a speed indicator the combination of two rotatively movable driving and driven members having opposed non-contacting extensive surfaces confining between them a practically constant body of torque-transmitting fluid medium, said surfaces being so closely proximate that the torque transmitted from the driving to the driven member is substantially proportional to the rate of rotation of the former.

19. A speed indicator comprising, in combination, a rotatable body, a second angularly movable body, means to resist displacement of the latter proportionately to the torque applied thereto, and a fluid medium interposed between them, said bodies having opposed annular surfaces in such close proximity that pumping of the medium therebetween is prevented and the deflections of the second body are made proportionate to the speed of the other.

20. A speed indicator, comprising, in combination, a rotatable, variable speed primary element, and a light, pivoted, torsionally-resisted, indication-controlling secondary element, suitably mounted for separate movement and operatively linked with the former through an interposed gaseous medium, said elements having opposed, annular, non-contacting surfaces so extensive and closely proximate that the whirling medium exerts a strong and steady turning effort upon the secondary element, substantially in linear proportion to the speed of the primary.

21. The combination, in a rate indicator, of a freely rotatable primary and a torsionally-resisted indication controlling secondary member mounted for separate movement, with their opposed non-contacting symmetrical surfaces confining therebetween a resident fluid body and arranged in such close proximity that the fluid, entrained in circles by the rotating primary exerts a torque on the secondary member in substantially linear proportion to the speed of the former.

22. In combination, in a speed-indicator, a rotatable primary element, a biased secondary element, a fluid body between and around them, said elements having opposed non-contacting extensive surfaces in such close proximity that the resident fluid body therebetween transmits torque to the secondary in substantially linear proportion to the speed of the primary element, and means for minimizing the rotary effort transmitted through the fluid around the elements.

23. A rate indicator comprising a structure confining a substantially unchanging body of fluid and including an extensive annular surface of a freely rotatable member, arranged to impart circular motion to the fluid, and a confronting annular surface of an indication-controlling angularly-displaceable member, arranged to take up momentum of the fluid, said surfaces being so closely proximate that the torque transmitted through the fluid is proportional to the speed of the rotatable member.

24. A speed indicator comprising two elements mounted for separate movement in a fluid medium, one of the elements being freely rotatable at varying speeds, and the other pivoted and biased against angular displacement, said elements having opposed non-contacting extensive symmetrical surfaces in such close proximity that torque is transmitted through the intervening fluid body in substantially linear proportion to the speed of the primary element, and a member surrounding said elements and minimizing the flow of the fluid along the exterior surfaces of said secondary element.

25. In a device of the character described, the combination of a rotatable primary element, a spring-biased secondary element, a casing surrounding the same and a fluid body filling the casing, said elements having opposed non-contacting annular surfaces in such close proximity that the rotary effort exerted through the fluid body on the secondary element is proportionate to the speed of the primary element, some parts of said casing being so closely proximate to said elements as to minimize torque-transmitting flow of the fluid along the exterior surfaces of the secondary element.

26. An air drag speedometer wherein a rotatable primary variable-speed element and a biased pivoted secondary element, mounted for separate movement in an air-containing casing, have opposed extensive smooth annular surfaces in such close juxtaposition that torque is transmitted through the air intervening between said surfaces in substantially linear proportion to the speed of the rotatable primary element.

27. A speed indicator comprising a closed fluid-filled casing, primary and secondary elements mounted therein, the one for rotation and the other for torsionally resisted angular displacement, said elements having opposed non-contacting extensive annular surfaces forming therebetween a smooth intervening channel wherein confined fluid may move in circles under the influence of the primary member, and between them and the interior surfaces of the casing surrounding channels wherein fluid contiguous to the secondary element may receive circular movement from the primary element, said surfaces being so closely proximate that torque transmission through the fluid is linearly proportionate to the speed of the primary element.

28. The combination, in a speed indicator, of a closed casing, a fluid body and two rotatively-movable members therein, means for rotating one of the members, means for resisting displacement of the other, and means controlled by the last named member for reading its displacement in terms of speed, said two members having opposed, non-contacting imperforate annular surfaces in such close proximity as to confine therebetween a film of fluid through which torque is transmitted to the resistant member in linear proportionality to the speed of the rotatable member.

29. The combination with a closed fluid containing casing, of a plurality of symmetrical bodies with smooth surfaces rotatably mounted therein, means for torsionally restraining some of said bodies, and means for rotating the others, said bodies being placed with their surfaces in such close proximity to each other and to the walls of the casing that the rotating bodies will cause an even and undisturbed circular motion of the fluid and transmit torque to the torsionally restrained bodies in proportion to the speed of the others.

30. In a speed measuring instrument, the combination of driving and driven members having in opposed closely adjacent non-contacting relation relatively extensive smooth friction surfaces, and an interposed gaseous body through which the driving member frictionally drags the driven member.

31. A tachometer comprising, in combination, a rotatably mounted shaft, a smooth annular body fixed thereto, a similar pivoted body, a torsion spring for the latter, indicating means movable with said pivoted body, and an air-containing casing, said bodies having their annular surfaces in such close, non-contacting proximity that the intervening air transmits torque to the pivoted body in substantially linear proportion to the speed of the rotatable body.

32. A tachometer comprising, in combination, a rotatably mounted shaft, a primary element carried thereby, a pivoted secondary element, a torsion spring therefor permitting its angular displacement substantially in proportion to the torque, indicating means operated by the pivoted element and graduated with substantial uniformity, and a fluid-containing casing closely investing part of said rotative system, the opposed surfaces of the elements being so closely proximate to each other and to part of the casing that the fluid-transmitted torque causing deflections of the pivoted body is substantially proportionate to the speed of the primary element.

In testimony whereof I affix my signature in the presence of two subscribing witnesses.

NIKOLA TESLA.

Witnesses:
M. LAWSON DYER,
THOMAS J. BYRNE.